United States Patent
Van Overveld et al.

(10) Patent No.: US 7,292,238 B1
(45) Date of Patent: Nov. 6, 2007

(54) METHOD OF DISPLAYING AN OUTPUT IMAGE OF A SCENE FROM A FREELY SELECTABLE VIEWPOINT

(75) Inventors: Cornelis W. A. M. Van Overveld, Eindhoven (NL); Maurice J. M. Cuijpers, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 0 days.

(21) Appl. No.: 09/067,910

(22) Filed: Apr. 28, 1998

(30) Foreign Application Priority Data

May 2, 1997 (EP) ................................. 97201313

(51) Int. Cl.
*G06T 15/00* (2006.01)
(52) U.S. Cl. ...................................... 345/419; 345/427
(58) Field of Classification Search ................ 345/433, 345/425, 419, 427, 606, 607; 382/286, 164
See application file for complete search history.

(56) References Cited

FOREIGN PATENT DOCUMENTS

JP        09097344 A        4/1997

OTHER PUBLICATIONS

Chen et al. 1993. "View Interpolation for Image Synthesis", Proceddings 20th Annual conference on Computer Graphics. ACM. pp. 279-286.*
By P.E. Debevec et al. Modeling and Rendering Architecture From Photographs: A Hybrid Geometry-and Image-Based Approach, Published in the Siggraph 1996, pp. 11-20.

* cited by examiner

*Primary Examiner*—Phu K. Nguyen

(57) ABSTRACT

A number of input images of a scene is taken from different viewpoints. A respective model of the scene is made for each input image. The model contains descriptions of the location of surface patches in the space of the scene, substantially each surface patch corresponding to a set of pixels in the input image. A viewpoint is selected and views are taken from the viewpoint, each of a respective input images according to the corresponding model. For each pixel in an output image one of the views is selected and a pixel from the selected view is displayed at the pixel in the output image.

11 Claims, 1 Drawing Sheet

Figure 1:
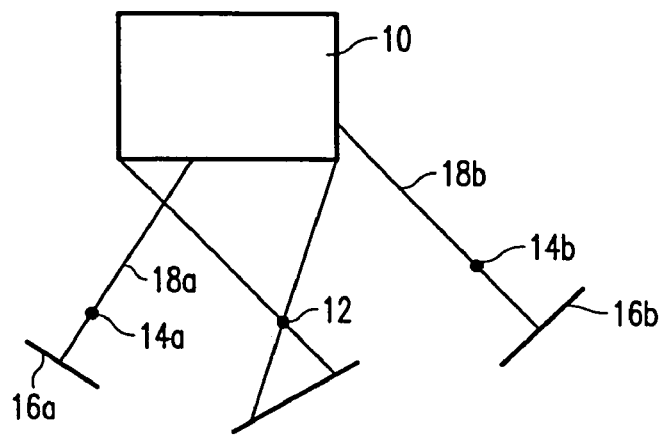

METHOD OF DISPLAYING AN OUTPUT IMAGE OF A SCENE FROM A FREELY SELECTABLE VIEWPOINT

The invention relates to a method of displaying an output image of a scene from a freely selectable viewpoint, the method comprising the steps of obtaining input images of the scene, each from a respective input viewpoint;

computing model information representing points located in a space of the scene from which input information in the input images originates;

selecting the selectable viewpoint;

determining for an output pixel in the output image which output point represented in the model information is visible in the output image at that output pixel;

determining a pixel value of that output pixel from the image information in the input image or input images which originated from the output point;

displaying the output pixel in the output image according to the pixel value.

In this context, the word "model" refers generally to information concerning the three dimensional position of points in the space of the scene that can be visible in an image; this may also encompass a background surface.

Such a method is known from an article titled "Modeling and rendering Architecture from Photographs: A hybrid geometry- and image-based approach" by P. E. Debevec, C. J. Taylor and J. Malik, published in the SIGGRAPH 1996 conference proceedings.

This publication is directed at viewing of architectural scenes. According to the known method a model of the scene is computed partly from distance measurements and partly from manual model input. Computation of the model is facilitated by imposing constraints that are typical for architectural scenes, such as the use of flat surfaces, square corners, repeated shapes etc. The model defines a number of surfaces that are the source of light for areas that are visible in the input images.

The process of constructing the output image metaphorically corresponds to projecting the input images onto the model from their respective viewpoints, and rendering the model from a selected viewpoint.

The known method has the disadvantage that a complete model is needed before viewing can begin. Construction of the model is expensive and time-consuming and usually requires the intervention of a human operator. Moreover, projection of the input images requires what is called the time-consuming elimination of "shadows" in the metaphor used hereinbefore, i.e. the prevention that input images are projected onto parts of the model that are connected to the input viewpoint of the input image by a line of sight that intersects another part of the model.

Amongst others, it is an object of the invention to provide for a faster method of displaying an output image from a freely selectable viewpoint.

The method according to the invention is characterized in that the method comprises steps according to the characterizing part of claim 1.

Due to noise in the images and the distance information the respective models will not generally be consistent, but this is resolved during the selection of the output point for display; no common model is needed. The amount of model information required is determined only by the number of input images that is used for displaying the output images. For new views additional input images and models can be added without modifying the available models. The problem of "shadows" is avoided when the respective points are determined by using a separate model for each input image, with substantially only surface patches related to the parts of the scene that are visible as regions in the input image from the viewpoint of the relevant input image. The surface patches preferably also include surface patches connecting surface patches for visible regions which appear to share a boundary in the input image, but at which boundary there is a jump in depth of the corresponding surface patches. This makes it possible track adjacency of regions in the input image from adjacency information about the corresponding surface patches.

Furthermore the determination which point is visible can be done rapidly because of the limited number of surface patches in individual models, in which a line from the viewpoint typically only intersects only one surface.

An embodiment of the method according to the invention is characterized in that, for selecting the output point from the respective point, preference is given to respective points with smaller difference between a first and second angle between a normal of the surface patch to which the respective point belongs and lines of sight to the respective point, from the selected viewpoint and the respective viewpoint of the input image corresponding to the respective point respectively.

An embodiment of the method according to the invention is characterized in that, for selecting the output point, preference is given to respective points with smaller difference between a first and second size of a projection of the output pixel and an input pixel respectively, when the output pixel and the input pixel are projected onto the surface patch.

The method according to the invention has another embodiment as described in claim 5. In this embodiment the fact that each model corresponds only to one input image is used to speed-up the computation of the output image.

The method has another embodiment as described in claim 6. In this way the different models limited to different input images are used to implement the simulation of lighting changes are used to compute lighting changes as well. In principle any of the techniques used for computing the output point visible in the output image can be used for determining the lighting point that receives light from the light source. A uniform point light source as well as a direction dependent light source such as a spotlight (a light source which emits light in a cone with limited width, e.g. 30 degrees) or a lightsource at infinite distance can easily be modeled in this way.

The method according to the invention has another embodiment as described in claim 7. In this embodiment makes it possible to insert image information from a set of further input images into the input images. The computation of the auxiliary images is preferably performed in the same way as described for the computation of the output images. The description of further surface patches corresponding to sets of pixels in the auxiliary images is preferably obtained by transforming the description of the surface patches for the further input images.

The invention also relates to a device for executing various aspects of the method.

Figure 2:
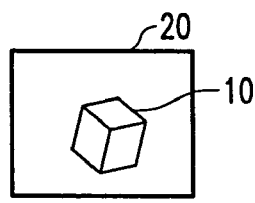
Figure 3A:
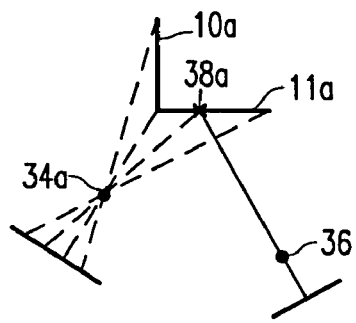
Figure 3B:
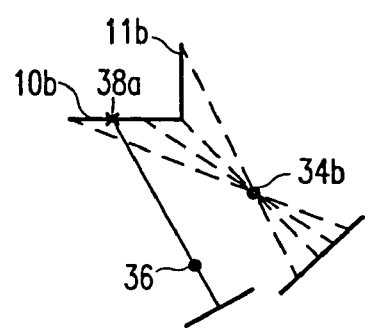
Figure 4:
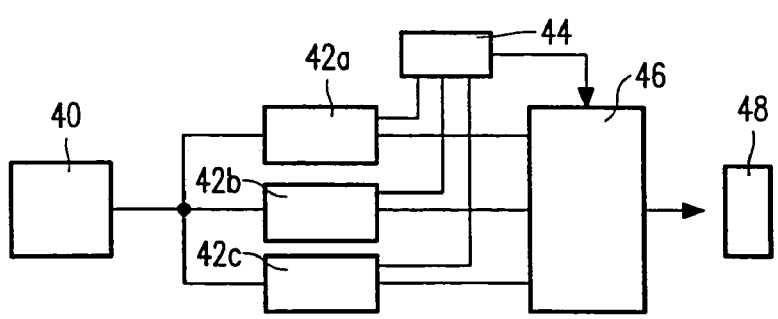

These and other advantageous aspects of the invention will be described using the following figures, of which FIG. 1 shows the geometry of a scene with a number of viewpoints, FIG. 2 shows an input image of the scene, FIGS. 3a,b show top views two models of the scene, FIG. 4 shows a device for displaying an image of the scene.

FIG. 1 shows the geometry of a scene containing an object 10. The purpose of the method and device according to the invention is to display an output image of such a scene as it is visible from a freely selectable output viewpoint 12.

To construct the output image, several input images of the scene are obtained e.g. with a camera (not shown) from a number of input viewpoints 14a,b (two input viewpoints 14a,b in the particular example of FIG. 1). Obtaining an input image with a camera corresponds to projecting the object 10 onto an image plane 16a,b through lines of sight 18a,b that run from the object 10 through the input viewpoint 14a,b to the image plane 16a,b.

FIG. 2 shows an example of a resulting image 20 of the scene with the object 10.

In combination with the input image, distance information da, db is obtained about the distance from the input viewpoint 14a,b from which the image is obtained to the points 16a,b in the scene that are visible in the input image. This can be done for example by measuring the amount of movement of the position of the representation of the point in the input image when the camera is moved, but many alternative measuring techniques are available, such illuminating the points 16a,b of the scene from the input viewpoint 14a,b and measuring the time of flight of the illumination from the input viewpoint 14a,b to the point 16a,b in the scene and back to the input viewpoint 14a,b. For each input image, a model of the scene is computed from the distance information.

FIGS. 3a,b represent an example of two models of the scene in an embodiment of the invention. The models contain for example the parameters of a number of flat triangular surface patches 10a,b 11a,b sharing boundary edges or at least having boundary edges that can be connected by surface patches which run parallel to the line of view from the camera (the surface patches are shown in lateral view as line segments 10a,b, 11a,b). FIGS. 3a,b also show the position of a selected output viewpoint 36 for which an output image is constructed.

The parameters of the surface patches are for example the coordinates of the corner points of the triangular surface patches 10a,b 11a,b. The surface patches 10a,b 11a,b and points 38a,b in the model correspond to areas and locations in the input images. This correspondence can be specified explicitly, for example by specifying the relation between corner-points of the surface patches and locations in the input image, but the correspondence also follows from the parameters of the surface patches, the input viewpoint 34a,b and the imaging geometry of a model of the camera used to obtain the image. For example, the imaging geometry may be modeled using a coordinate system in which the optical (projection) axis defines the z-axis used to obtain the ith input image and the x and y axis define the horizontal and vertical of the ith input image respectively, the imaging geometry specifying a relation $s=Q_i r+p_i$ between vectors "r" corresponding to points on the surface patches and vectors "s" in the coordinate system for the camera ($Q_i$ being a rotation matrix for the ith input image and $p_i$ being a translation vector for the ith input image).

The shape of the surface patches and their parameters are computed so as to provide an approximation of the distance information obtained for the input image. Boundaries between surface patches are placed for example so that the boundaries of the corresponding areas in the input image are at locations in the input image where the distance information exhibits a sudden change and preferably fitted to locations where the content of the input image exhibits an edge. Boundaries may be placed also inside areas without sudden changes or edges in order to minimize errors due to nonlinear change of distance. The model preferably contains only surface patches for areas that are visible in the input image and preferably every location in the input image belongs to a surface patch.

In one embodiment the surface patches of the model are constructed by subdividing the input image into a set of polygons (preferably triangles). For each of the polygons the distance information is approximated by a linear distance profile, which equals the measured distance at least to within a threshold value. These polygons and distance profiles, together with the location of the input viewpoint and imaging geometry of the camera, may be used to define surface patches forming the model for the input image. Preferably, very small polygons (less than a predetermined number of pixels, say 10 pixels) and polygons that correspond to surface patches that run (almost) parallel to the line of sight from the input viewpoint are eliminated from such a model (i.e. if the angle between the line of sight and the normal to the surface patch differs from 90 degrees by less than a predetermined angle, say 8 degrees) or deemed not to be visible at any pixel in the input image, to avoid using such surface patches as source for output pixels.

In addition to surface patches for visible parts in the input image, auxiliary surface patches running parallel to the line of view from the viewpoint may be included in the model for boundaries between parts, in case these boundaries correspond to a jump in distance, such as is the case when the parts on different sides of the boundary belong to different objects that are spatially separated from each other.

FIG. 4 shows a device for displaying an image of the scene. This particular device is shown only to illustrate the basic functions of the invention: in practice the functions of the various elements in FIG. 4 may be distributed in different ways, or the functions could be performed by a program executed by a computer processor. The device contains an element 40 for selecting the output viewpoint (and preferably also a camera attitude, the attitude and viewpoint being selected for example in terms of a rotation matrix Q and a translation vector p as defined for the input images). The element 40 for selecting the output viewpoint is coupled to a number of rendering units 42a-c, each for a respective input image and corresponding model. The rendering units 42a-c have outputs coupled to a comparison unit 44 and a multiplexer 46. An output of the multiplexer 46 is coupled to a display unit 48.

In operation, a different input image and corresponding model is loaded into each respective rendering unit 42a-c. The element 40 for selecting the output viewpoint selects an output viewpoint 12 and signals the output viewpoint 12 to each of the rendering units 42a-c. Each rendering unit 42a-c starts computing an output image from the output viewpoint (and preferably according to camera attitude) according to the input image and model loaded into it, for example a pixel value for one output pixel in the output image at a time. The rendering units 42a-c supply pixel values for the same output pixel to the multiplexer 46, if the model defines a pixel value for that output pixel.

For this purpose the rendering unit 42a-c first determines which of the surface patches contains an output point which is visible at the output pixel and then it determines which pixel(s) in the input image correspond(s) to that output point. From the pixel value(s) the output pixel value is computed.

The determination of the output point requires determining which surface patch is visible at the output pixel. In a very fast embodiment the rendering units 42a-c use a scan-line algorithm to compute this surface patch. In the scan-line algorithm a rendering unit 42*a-c* computes output pixels successively for a progression of positions along a line in the output image called the "scan-line" (preferably the scan-line is the line along which the display unit 48 scans the output image).

The scan-line and the viewpoint together define a plane, which passes through the scan-line and the viewpoint. Each rendering unit 42*a-c* computes intersections between this plane and the surface patches of the model loaded into the rendering unit. These intersections are line segments that each project onto an interval of the scan-line in the output image. The collection of line segments also corresponds to a piece-wise linear continuous path through the input image, with linear segments crossing image areas that correspond to surface patches or running along the boundary between surface patches.

The rendering unit 42*a-c* sorts the intervals in increasing position along the scan-line and removes (parts of) the intervals that are occluded by other intervals from the model stored in the rendering unit 42*a-c*. When it outputs a first output pixel, the rendering unit 42*a-c* determines in which of the intervals an actual output pixel lies; thereby it is known that the output point visible at the output pixel is on the surface patch corresponding to the interval. Subsequent output pixels "see" output points belonging to the same surface patch until it is found that the progression of output pixels along the scan-line crosses the border between two intervals, in which case the new interval lying on the opposite side of the border is used to determine the surface patch.

The skilled person will know such scan-line algorithms per se from the state of the art. However, the known algorithms can be improved when use is made of the particular properties of the models used according to the invention. In particular, the time needed for sorting the intervals and the removing occluded (parts of) intervals can be reduced when use is made of the fact that the line segments correspond to a piece-wise linear continuous path in the input image.

To make use of this, the line segments are processed in the order in which they appear in this path and information is kept about a continuous range R on the scan-line which is spanned by intervals corresponding to processed line segments (the range R being specified for example by a minimum and a maximum position), an auxiliary segment A connecting the points in the model corresponding to the endpoints of the continuous range, an ordered list L of intervals corresponding to visible processed line segments, in the order in which they appear on the scan-line.

A pseudo-program which exemplifies finding the intervals is

```
for (line segments S, consecutively as they appear in the path)
  {if(closer_to_viewpoint(beginning_of(S),A))
    {if(not outside(interval(S),R)) remove_overlap(interval(S),L);
     add_to(interval(S), L);
    }
   else
    {I=part_outside(interval(S),R);
     add_to(I,L);
    }
   extend(R, interval(S));
  }
```

In other words, when a next line segment on the path is processed, it is determined whether a beginning of the line segment (which is connected to the previous line segment along the path) is closer to or farther from the viewpoint than the auxiliary segment (i.e. whether that auxiliary line segment is between the beginning and the viewpoint). If the next line segment is closer and its interval is outside the range, its interval is prefixed or postfixed to the ordered list as appropriate provided the line segment is visible (turned toward the viewpoint). If the next line segment is closer and its interval is at least partly in the range, its interval is put in the list when it is visible and any interval which it overlaps is removed from the ordered list to the extent it is overlapped. If the next line segment is farther, it is determined whether the interval of the next line segment extends outside the range. If so, the part of the interval that extends outside the range is added to the ordered list if it is visible. In any case the range is extended if necessary to include the interval corresponding to the segment. This is repeated for next-line segments until all line segments have been processed. In this way, if there are N surface patches, the output image can be computed in order N time, which is faster than for arbitrary models.

The multiplexer 46 passes one of the pixel values to the display unit 48. Each rendering units 42*a-c* also signals parameters of the surface patch which is visible at the output pixel to the comparison unit 44. The comparison unit 44 compares these parameters and on the basis of the comparison selects one of the rendering units 42*a-c* and commands the multiplexer 46 to pass the pixel value from that rendering unit 42*a-c* to the display unit 48.

The comparison unit 44 selects which input image and corresponding model will determine the pixel value of the output pixel in the output image. This selection is based on a number of considerations.

Consideration is given to the distance between the selected output viewpoint and the distance of the point on the surface patch in a particular model which maps onto the output pixel. As a rule, the model that defines the closest point is preferred.

Consideration may be given to the pixel size: an input pixel in the input image when projected back onto the surface patch through the input viewpoint of the input image will have a certain input size, and the output pixel projected back through the selected output viewpoint will have an output size. As a rule, the model in which the input size and the output size most closely match will be preferred.

Consideration may also be given to the angle between the normal of the surface patch and the line of sight: the line of sight from the input viewpoint to the surface patch makes an input angle with the normal and the line of sight from the output viewpoint to the surface patch makes an output angle with the normal. As a rule, the model in which the input and output angle match most closely will be preferred.

Preferably, a combination of these considerations is used. In particular selection of an input image and corresponding model should be avoided, if possible, when any one of these considerations indicates that the distance, pixel size or angle for that input image and corresponding model is in a critical range. Critical ranges are said to occur for example when the distance to the surface patch from the model exceeds the distance to the surface patch of another model by more than a threshold value (this threshold value reflects the error margin in the models), when the input and output angle differ more than a further threshold value, when the output angle differs from ninety degrees by less than a yet further threshold value or when the input size exceeds the output size by more than a minimum factor. Outside the critical range any one of the considerations or a weighted combination may be used to select a preferred input image and model.

Preferably, the rendering units 42a-c also ignore a number of surface patches from the model when the pixel value is determined. For example, if it is determined that a surface patch runs parallel to the viewing direction (i.e. that the angle between its normal and the line of sight from the input viewpoint of the image differs from 90 degrees by less than a threshold value of, say, 8 degrees) a rendering unit 42a-c may decide to ignore that patch. Similarly the rendering unit may ignore patches that maps to less than a predetermined number of input pixels from the input image, or if the patch is an artifact, needed for example to complete the coverage in the subdivision of the input image.

The comparison unit 44 does not need to make the decision for each output pixel. The rendering units 42a-c may use a scan-line algorithm, in which the output pixels are visited along a line, the "scan-line" (preferably line along which the display unit 48 scans the output image). The pixel values are computed for a progression of output pixels along the scan-line. In this case each rendering units 42a-c divides the line in intervals, each interval corresponding to a set of successive output pixels on the scan-line that display points from the same respective surface patch in the model loaded into the rendering unit 42a-c. For the part of the progression of output pixel inside a segment the rendering unit does not need to redetermine the surface patch visible from the output pixels. Each rendering unit 42a-c signals the transition from one segment to another to the comparison unit 44, together with the parameters of the surface patch corresponding to the new segment. The comparison unit 44 then selects a rendering unit every time a new segment is signalled and this selection persists at least until a next segment is signalled. Thus the amount of computation needed for selection can be reduced in comparison with selection of a surface patch for each pixel individually. A filter operation may be performed on the output of the multiplexer 46 to smooth out transitions between selections of different rendering units 42a-c.

Prior to rendering, the input images may be altered to simulate an additional light source. For this purpose, one or more light sources are defined. For each light source a source point in space where the lightsource is located is chosen. It is determined which pixels in the input images are visible from the point where the lightsource is located, and if a pixel is visible, its pixel value is altered to simulate the effect of the lightsource. Subsequently the altered images are used to construct the output image.

The determination for each pixel of the input images whether that pixel is visible from the source point of the light source is preferably implemented using the same method as described for forming the output image: a number of "output pixels" is defined for the light source, each corresponding to a light beam emitted in a particular direction. It is determined for each respective model which, if any, output point from the surface patches is visible in the respective image, and if there is such an output point in more than one input image, one of these images is selected as described hereinbefore, for example by selecting the closest point. Alternatively, points may be selected for several input images at a time if the distance between these points is below a threshold value, reflecting the error margin of the models.

Thus the effect of shadow is simulated using the same technique as used for constructing the output image. The pixel values $Ci$ of pixels "i" in the selected image that correspond to the output point are altered, for example according to the following formula:

$$Ci' = Ci(1+faI) + fbICL$$

Here $Ci'$ is the altered pixel value (preferably $Ci$, $Ci'$ and CL are colour vectors), I is an intensity factor of the light source, CL is a (preferably normalized) colour vector of the light source and fa and fb are correction factors that are selected to create a desired lighting effect. When fa is much larger than fb (fa being for example in the range of e.g. 0.1 to 10.0) the colour of the surface patch is approximately the same as in the original image and the intensity is determined mainly by the light source. Increasing the factor fb relative to fa makes is possible to alter the colour of the surface patch to simulate the effect of the colour of the lightsource.

It is possible to insert or delete objects in the set of input images. Deletion is effected by designating a collection of surface patches associated with at least one image. The input pixels in the input image associated with the designated surface patches are marked as "invalid" and the designated surface patches are removed from the model or their depth is changed so that they will not affect the output image. To ensure consistency among the input images when a designated surface patch from an input image is deleted, each of the input images is analyzed to determine which of the other surface patches associated with those input images contain points in scene-space that on any designated surface patch, or have a distance to such a surface patch that is within an error margin. Such surface patches are also considered to be designated and are removed. Such surface patches are easily found, given the camera positions used to obtain the input images and the depth information. Alternatively, designated surface patches may be selected only by a human editor.

The pixels in the input images that correspond to designated surface patches are marked as invalid. When the output image is computed a pixel marked "invalid" in an input image is ignored.

Insertion involves two sets of input images with corresponding models, a first set depicting an original scene and a second set depicting, amongst others, the object to be inserted. To insert an object, surface patches of the object are designated which correspond to parts of the images of the second set. The designations may be processed in a similar way as designations of surface patches to be deleted, except that those surface patches that would be deleted in that case are now collected, and are said to represent the object to be inserted in the input images of the first set.

A position and attitude is chosen for the object relative to the scene depicted by the input images of the first set. From this auxiliary viewpoints and viewing attitudes (rotation and orientation of the optical axis) relative to the object are computed, each corresponding to a respective viewpoint and viewing attitude that was used to obtain an input image of the first set. Auxiliary input images are computed of the designated surface patches from the second set of input images viewed from the auxiliary viewpoint and according to the auxiliary viewing attitude. For example, the chosen position and attitude of the object may be specified by a transformation relating vectors r1 representing points in the space of the scene to vectors r2 representing points in the space containing the object e.g. r1=Qins r2+ pins (Qins being a rotation matrix and pins a translation vector). The model of an input image "i" from the first set specifies a relation s=Qi r+pi between vectors "r" corresponding to points on the surface patches and vectors "s" in the coordinate system for the camera. In this case, the auxiliary viewpoint and attitude are specified by a relation s=Qi Qinsr+Qipins+pi, i.e. by a rotation matrix Qi Qins and a translation vector Qipins+pi.

This computation of the auxiliary input images is preferably performed in basically the same way as the computation of the output image described hereinbefore (using the rendering units 42a-e, multiplexer 46 and comparison unit 44 of FIG. 4), except that for each auxiliary viewpoint and for each surface patch that is visible from that viewpoint information is computed representing the position of that surface patch in the space of the scene. Preferably the information about the surface patches for the auxiliary images is computed by transforming the information already available for surface patches in the second set of input images, parts of the latter surface patches being cut-off if they are not visible in the auxiliary image. Thus, it is not necessary to compute distance for individual pixels.

Subsequently, each auxiliary input image is inserted in the input image of the first set with corresponding viewpoint and attitude. Pixel values of pixels for which the auxiliary image provides information are replaced by pixel values of corresponding pixels from the auxiliary image, provided that the auxiliary image provides the closest point (or that any other condition described hereinbefore for selecting between two input image for determining a pixel value in the output image is met). Descriptions of surface patches corresponding to the auxiliary input image are added for those pixels that have been replaced. The modified input images are then used to obtain an output image in the way described hereinbefore.

What is claimed is:

1. A method of displaying an output image of a scene from a freely selectable viewpoint, the method comprising the steps of
    obtaining input images of the scene, each from a respective input viewpoint;
    computing model information representing points located in a space of the scene from which input information in the input images originates;
    selecting the selectable viewpoint;
    determining for an output pixel in the output image which output point represented in the model information is visible in the output image at that output pixel;
    determining a pixel value of that output pixel from the image information in the input image or input images which originated from the output point;
    displaying the output pixel in the output image according to the pixel value,
    computing a respective model for each input image, the respective model comprising information about surface patches located in the space of the scene, substantially each surface patch corresponding to a respective set of pixels in the respective input image;
    determining for each respective model which, if any, respective point from the surface patches of that respective model is visible in the output image at the output pixel according to that respective model,
    selecting the output point from the respective points on the basis of comparison of parameters of the surface patches containing the respective points in different models for which the respective points have been found;
    determining the pixel value from the image information in the input image corresponding to the respective model from which the output point is selected.

2. A method according to claim 1, wherein for selecting the output point from the respective points, preference is given to respective points with smaller distance to the selected viewpoint.

3. A method according to claim 1, wherein for selecting the output point from the respective points, preference is given to respective points with smaller difference between a first and second angle between a normal of the surface patch to which the respective point belongs and lines of sight to the respective point, from the selected viewpoint and the respective viewpoint of the input image corresponding to the respective point respectively.

4. A method according to claim 1, for selecting the output point, preference is given to respective points with smaller difference between a first and second size of a projection of the output pixel in the output image and an input pixel in the input image corresponding to the respective point respectively, when the output pixel and the input pixel are back-projected onto the surface patch.

5. A method according to claim 1, wherein for each particular input image an ordered list of intervals in the output image is computed, the intervals corresponding to segments of respective surface patches successively visible along a scan-line in the output image, the scan-line containing the output pixel, the output point being determined by determining the interval in which the output pixel lies, and wherein the ordered list is computed by processing the line-segments successively in an order in which they are visible along a path in the particular input image, a representation being kept of a continuous range along the scan-line spanned by the intervals of processed line-segments, a foreground/background position of a line-segment being determined by comparing the line-segment to an auxiliary line segment extending between points in the model corresponding to the endpoints of the continuous range.

6. A method according to claim 1, wherein altered pixel values are computed for pixels of the input images, so as to represent the effect of lighting changes, the method comprising
    selecting a source point in the scene and a lighting distribution image located relative to the source point, a respective lighting pixel value being associated with each light pixel in the lighting distribution image;
    determining for each respective model which, if any, respective lighting point from the surface patches of that respective model would be visible in the lighting distribution image at a light pixel according to that respective model,
    selecting an alterable point from the respective lighting points on the basis of comparison of parameters of the surface patches containing the respective lighting points in different models for which the respective lighting points have been found;
    altering the image information in the input image corresponding to the respective model from which the alterable point is selected at an alterable pixel corresponding to the alterable point.

7. A method according to claim 1 comprising
    obtaining further input images from a further scene, each from a respective further viewpoint in combination with a respective further models comprising information about surface patches located in a space of the further scene, substantially each surface patch corresponding to a respective set of pixels in the further input image;
    designating a collection of further surface patches from the further models;

selecting position and attitude for the collection of further surface patches relative to the further scene;

determining respective auxiliary viewpoints relative to the further scene so that each of the respective auxiliary viewpoints has a same spatial relation to the further surface patches as a respective one of the viewpoints when the further surface patches are located according to the selected position and attitude;

computing a set of auxiliary images of the further surfaces in the collection from the auxiliary viewpoints and computing auxiliary models describing the further surface patches in the collection as far as they correspond to sets of pixels in the auxiliary images;

replacing a pixel value and model information in the input images by a pixel value and auxiliary model information from the auxiliary images prior to computing the output image when a depth from the respective viewpoint of the input image to a point in the scene represented by the pixel value is greater than a depth from the corresponding auxiliary viewpoint to a visible point on a further surface patch from the collection.

8. A device for displaying an output image of a scene from a freely selectable viewpoint, the device comprising memory for storing input images of the scene, each from a respective input viewpoint;

memory for storing model information representing points in the scene from which input information in the input images originates;

means for selecting the selectable viewpoint;

means for determining for an output pixel in the output image which output point represented in the model information is visible in the output image at that output pixel;

means for determining a pixel value of that output pixel from the image information in the input image or images which originated from the output point;

a display unit receiving the pixel value for displaying the output pixel in the output image according to the pixel value, wherein the memory for storing model information is arranged to store a respective model for each input image, the respective model comprising information about surface patches located in the space of the scene, substantially each surface patch corresponding to a respective set of pixels in the respective input image; the device comprising means for determining for each respective model which, if any, respective point from the surface patches of that respective model is visible in the output image at the output pixel according to that respective model, means for selecting the output point from the respective points on the basis of comparison of parameters of the surface patches containing the respective points in different models for which the respective point has been found;

means for determining the pixel value from the image information in the input image corresponding to the respective model from which the output point is selected.

9. A device according to claim 8 wherein altered pixel values are computed for pixels of the input images, so as to represent the effect of lighting changes, the device comprising means for selecting a source point in the scene and a lighting distribution image located relative to the source point, a respective lighting pixel value being associated with each light pixel in the lighting distribution image;

means for determining for each respective model which, if any, respective lighting point from the surface patches of that respective model would be visible in the lighting distribution image at a light pixel according to that respective model, means for selecting an alterable point from the respective lighting points on the basis of comparison of parameters of the surface patches containing the respective lighting points in different models for which the respective lighting points have been found;

means for altering the image information according to a lighting model in the input image corresponding to the respective model from which the alterable point is selected.

10. A device according to claim 8, wherein the means for determining for each model which output point is visible determine for each particular input image an ordered list of intervals in the output image is computed, the intervals corresponding to segments of respective surface patches successively visible along a scan-line in the output image, the scan-line containing the output pixel, the output point being determined by determining the interval in which the output pixel lies, and wherein the ordered list is computed by processing the line-segments successively in an order in which they are visible along a path in the particular input image, a representation being kept of a continuous range along the scan-line spanned by the intervals of processed line-segments, the foreground/background position of a line-segment being determined by comparing the line-segment to an auxiliary line segment extending between points in the model corresponding to the endpoints of the continuous range.

11. A device according to claim 8, comprising means for obtaining further input images from a further scene, each from a respective further viewpoint;

designating a collection of further surface patches from the further models;

selecting a position and attitude for the collection of further surface patches relative to the further scene;

determining respective auxiliary viewpoints relative to the further scene so that each of the respective auxiliary viewpoints has a same spatial relation to the further surface patches as a respective one of the viewpoints when the further surface patches are located according to the selected position and attitude;

computing a set of auxiliary images of the further surfaces in the collection from the auxiliary viewpoints and computing auxiliary model information representing depth of the further surface patches in the collection from the auxiliary viewpoints;

replacing a pixel values and model information in the input images by a pixel value and auxiliary model information from the auxiliary images prior to computing the output image when a depth from the respective viewpoint of the input image to a point in the scene represented by the pixel value is greater than a depth from the corresponding auxiliary viewpoint to a visible point on a further surface patch from the collection.

* * * * *